3,507,509
JAW CHUCK
Milton L. Benjamin, David D. Walker, and Wilbur N. Miles, Chagrin Falls, Ohio, assignors to Erickson Tool Company, Solon, Ohio, a corporation of Ohio
Filed Feb. 15, 1968, Ser. No. 705,655
Int. Cl. B23b *31/16*
U.S. Cl. 279—112         8 Claims

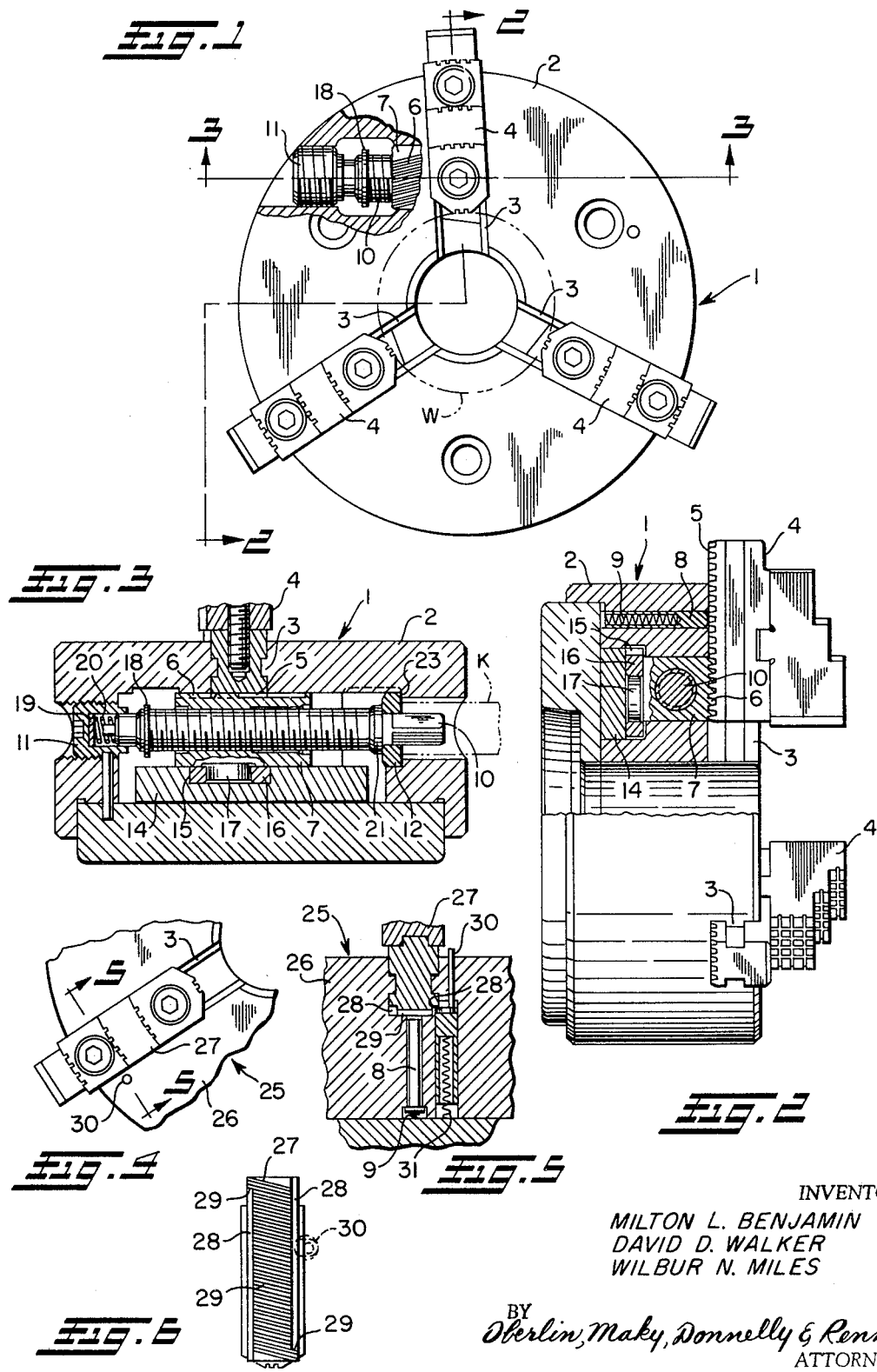
April 21, 1970 — M. L. BENJAMIN ET AL — 3,507,509
JAW CHUCK
Filed Feb. 15, 1968
INVENTORS
MILTON L. BENJAMIN
DAVID D. WALKER
WILBUR N. MILES
BY Oberlin, Maky, Donnelly & Renner
ATTORNEYS United States Patent Office 3,507,509
Patented Apr. 21, 1970

ABSTRACT OF THE DISCLOSURE

Jaw chuck embodying automatic catch means which must be manually released from the jaws before the latter may be removed from the chuck body for turning end for end or for replacement.

Background of the invention

Heretofore, it has been known to provide visual signal means on a jaw chuck to denote that the jaw actuator teeth are disengaged from the jaw teeth for radial positioning or removal of the jaws. If the machine operator overlooks such visual signal, the rotation of the chuck will cause the jaws to be thrown out by centrifugal force with consequent damage to the machine and possible personal injury of the operator or others who may be stuck by the flying jaws.

Summary of the invention

A principal object of the present invention is to provide a jaw chuck having automatic catch means which must be manually released from the jaws before the jaws can be removed from the chuck body for turning end for end or for replacement.

More specifically, it is another object of this invention to provide a jaw chuck having automatic catch means which is spring-biased to jaw-retaining position thus requiring manual actuation against the spring bias before the jaws are released for removal from the chuck body.

It is another object of this invention to provide a jaw chuck having a spring actuated catch means as aforesaid, which additionally requires manual operation for insertion of the jaws in the chuck body.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of a few of the various ways in which the principle of the invention may be employed.

Brief description of the drawing

FIG. 1 is a front elevation view partly broken away illustrating a jaw chuck embodying the present improvements;

FIG. 2 is a cross-section view taken substantially along the line 2—2, FIG. 1;

FIG. 3 is a cross-section view taken substantially along the line 3—3, FIG. 1;

FIG. 4 is a fragmentary front elevation view illustrating another embodiment of the present invention;

FIG. 5 is a cross-section view taken substantiallly along the line 5—5, FIG. 4; and FIG. 6 is a bottom plan view of a chuck jaw as viewed upwardly from the bottom of the jaw in FIG. 5.

Discussion of the invention

Referring first to the embodiment of the invention illustrated in FIGS. 1, 2, and 3, the chuck 1 shown for purposes of illustration comprises a chuck body 2 having radial slots 3 in which jaws 4 are guided for radial inward and outward movement. Each jaw 4 is formed with diagonally extending teeth 5 for meshing with inclined teeth 6 on an associated wedge block 7 which is guided in the chuck body 2 to move generally transverse to the associated radial slot 3. When the teeth 5 and 6 are disengaged by movement of said wedge block 7 to an extreme left position as viewed in FIGS. 1 and 3, the associated jaw 4 may be radially positioned as desired, the detent 8 biased by spring 9 engaging the interdental spaces to locate the jaw teeth 5 so that when the wedge block 7 is moved toward the right from extreme left position the teeth 6 will mesh with teeth 5.

The wedge blocks 7 are preferably of identical construction except that only the one shown in FIGS. 1, 2, and 3 has a spindle 10 in screw-threaded engagement therewith, the spindle 10 being rotatably supported in the chuck body 2 by a screw bushing 11 and a thrust ring 12. As evident, when the spindle 10 is turned in opposite directions as by a suitable key or wrench K, the wedge block 7 will be caused to move to the left or right, as desired, and the interengaging teeth 5 and 6 will cause radial inward or outward movement of the associated jaw 4 to grip or release a workpiece W.

The movement of said one wedge block 7 responsive to turning of the spindle 10 is transmitted to the other two wedge blocks 7 (not shown) as by means of a transmission ring 14 which is rotatably supported in the chuck body 2 and which has three radial slots 15 engaged by drive rings 16 that are pivotally mounted on the bosses 17 of the respective wedge blocks 7.

When it is desired to change the gripping diameter of the jaws 4 or when it is desired to replace the jaws 4 or to turn them around end for end, the spindle 10 will be turned until the wedge block 7 engages a collar or snap ring 18 on said spindle 10. When that occurs, the teeth 6 of the wedge blocks 7 are in mesh with the teeth 5 of the respective jaws 4 a relatively short distance such as 1/16" or 1/8" for example. The bushing 11 aforesaid, has a hardened thrust disk 19 therein, and a spring 20 between the end of the spindle 10 and said disk 19 yieldably urges the spindle 10 toward the right to maintain shoulder 21 against the thrust ring 12 and the latter against the shoulder 23 in the chuck body 2.

When it is desired to disengage the teeth 6 of the wedge blocks 7 from the teeth 5 of the respective jaws 4 while the wedge block 7 is engaged with the collar or snap ring 18 of the spindle 10, the spindle 10 must be pushed axially toward the left as viewed in FIGS. 1 and 3 until the left end of the spindle 10 engages the thrust disk 19. This movement of the spindle 10 compresses the spring 20 and the wedge block 7 moves with the spindle 10 so that the teeth 6 of all three wedge blocks 7 are thereby disengaged from the teeth 5 of the jaws 4. With the teeth 5 and 6 thus disengaged, any or all of the jaws 4 may be radially repositioned by clicking along the respective detents 8 or the jaws 4 may be withdrawn from the chuck body 2 for replacement or servicing or for turning around end for end. When the jaws 4 have been thus repositioned radially, or reinserted into their respective guide slots 3, the release of the axial pressure on the spindle 10 automatically effects re-engagement of the teeth 5 and 6 by reason of the spring 20 urging the spindle 10, shoulder 21 into engagement with the thrust ring 12.

In the form of the invention illustrated in FIGS. 1 to 3, the jaws 4 cannot be reinserted into the chuck body 2 unless the spindle 10 has first been pressed axially toward the left since otherwise the ends of the teeth 6 of the wedge blocks 7 extend slightly into the respective guide slots 3.

If, while the wedge blocks 7 are being moved in clockwise direction, as viewed in FIG. 1, or toward the right as viewed in FIG. 3, the workpiece W is engaged by the jaws 4, continued turning of the spindle 10 will result in compression of the spring 20 and ultimate abutment of the thrust disk 19 with the end of the spindle 10, whereby the workpiece W is first yieldably gripped and then positively gripped. When the workpiece is gripped by movement of the wedge blocks in a counterclockwise direction, as viewed in FIG. 1, or toward the left as viewed in FIG. 3, the engagement of the jaws 4 with a workpiece will produce a direct thrust on the thrust ring 12 without such yielding.

Referring now to the embodiment of the invention disclosed in FIGS. 4, 5 and 6, the chuck 25 is generally the same as that shown in FIGS. 1, 2, and 3, except that the spindle, not shown, is simply journalled in the chuck body 26 with thrust means at both ends to retain the spindle against axial movement in both directions.

Each jaw 27 in the FIGS. 4 to 6 embodiment of the invention has a longitudinally extending notch 28 along each side which extends throughout the length of said jaw 4 except for the radially innermost tooth 29 on one side and the radially outermost tooth 29 on the other side. When the teeth 6 of the wedge blocks 7 are out of engagement with the teeth 29 of the respective jaws 27, the jaws 27 may be radially positioned in the respective guide slots 30 by clicking over the respective spring detents 8.

Disposed in one of the jaw notches 28 is the head of a locking pin 30 which is biased upwardly as viewed in FIG. 5 by a spring 31, and thus the head of the locking pin 30 will lie in the path of the then radially innermost tooth 29 of the jaw 27. Thus, even though the jaw and wedge block teeth 27 and 6 may be disengaged for radial positioning of the respective jaws 27, inadvertent rotation of the chuck 25 will not permit the jaws 27 to be thrown out of the chuck body 26 because such throwing out would be prevented by the radially innermost tooth 29 of each jaw 27 engaging its respective locking pin 30. Accordingly, the jaws 27 cannot be withdrawn from the chuck body 25 unless the respective locking pins 30 are pushed downwardly so that the head thereof clears the radially innermost teeth 29 of the respective jaws 27. Similarly, reinsertion of the jaws 27 requires depression of the respective locking pins 30.

Accordingly, with both forms of the invention there is assurance that inadvertent rotation of the chuck 1 or 25 will not permit the jaws 4 or 27 to be thrown out radially to cause property damage or personal injury. In FIGS. 1 to 3 the spindle 10 must be manually pushed in to overcome the force of the spring 20 before any or all of the jaws 4 may be radially withdrawn and in FIGS. 4 to 6 the jaws 27 may be radially positioned when the wedge block and jaw teeth 6 and 29 are disengaged, but the respective locking pins or catch means 30 must first be manually depressed against their respective spring 31 before the jaws 27 may be radially withdrawn for turning end for end or for replacement or servicing. Likewise, in both forms of the invention, manual operation of the automatic catch means is required before the jaws 4 or 27 may be inserted into the chuck body 2 or 26.

Other modes of applying the principle of the invention may be employed, change being made as regards the details described, provided the features stated in any of the following claims, or the equivalent of such, be employed.

We therefore, particularly point out and distinctly claim as our invention:

1. A chuck comprising a body; a plurality of jaws on said body, at least one of which is radially movable to grip and release a workpiece within or around said jaws; actuator means movable in said body generally transversely to said one movable jaw and having inclined teeth intermeshing with teeth on said one jaw to move the latter radially inward and outward responsive to movement of said actuator means in opposite directions; said actuator means comprising a first member having said teeth thereon, a second member rotatable in said body and having screw threaded engagement with said first member whereby upon rotation of said second member, said first member is moved to cause radial movement of said one jaw; stop means between said first and second members to arrest movement of said first member in one direction while said actuator means and jaw teeth are yet in mesh to a slight extent; and spring means bearing on one of said members to permit additional movement of said members in said one direction to disengage said teeth for radial positioning or withdrawal of said one jaw from said body, the slight mesh of the actuator means and jaw teeth prior to compression of said spring means precluding inadvertent radial withdrawal of said one jaw except upon said additional movement of said members.

2. The chuck of claim 1 wherein said body has spring detent means engaging the teeth of said one jaw to locate the teeth thereof for remeshing with the teeth of said first member upon movement of said members in the opposite direction by said spring means.

3. The chuck of claim 1 wherein one of said members abuts said body to provide for limited yielding movement of said second member against said spring means during movement of said first member in the opposite direction by turning of said second member while said one jaw is engaged with a workpiece.

4. A chuck comprising a body; a plurality of jaws on said body, at least one of which is radially movable to grip and release a workpiece within or around said jaws; actuator means movable in said body generally transversely to said one movable jaw and having inclined teeth intermeshing with teeth on one said jaw to move the latter radially inward and outward responsive to movement of said actuator means in opposite directions; said one jaw having a lateral projection; a catch means comprising a spring biased member movable out of the path of radial movement of said projection whereby, upon disengagement of the teeth of said actuator means from the teeth of said one jaw, said one jaw may be withdrawn from said body; said spring biased member being radially outward of said projection; and spring detent means contained by said body engaging the teeth of said one jaw to locate the teeth thereof for re-meshing with the teeth of said actuator means after radial repositioning or reinsertion of said one jaw.

5. The chuck of claim 4 wherein said lateral projection constitutes a longitudinal extension of a tooth of said one jaw disposed radially inward of said spring biased member.

6. A chuck comprising a body having a plurality of radially extending slots; jaws radially movably guided in said slots to grip and release a workpiece therebetween or thereabout; each jaw having parallel teeth extending angularly with respect to a line perpendicular to the line of radial movement of said jaw; actuators movable in said body generally transversely to the respective jaws and having parallel teeth intermeshing with the teeth of the respective jaws to move the latter radially inward and outward responsive to movement of said actuators in opposite directions; a transmission ring rotatable in said body; driving members on the respective actuators having driving connections with said ring whereby movement of one actuator transmits the same motion to the other actuators through said ring and driving members; a spindle rotatable in said body and having screw threaded engagement with said one actuator thus to move said one actuator; stop means between said spindle and said one actuator to arrest movement of said one actuator in one direction while the teeth thereof and of the other actuators are yet in mesh to slight extent with the teeth of the respective jaws; and spring means bearing on said spindle to permit additional movement of said spindle and said one actuator in said one direction without rotation of said spindle to disengage the actuator and jaw teeth for radial positioning or withdrawal of said jaws in or from said slots of said body.

7. The chuck of claim 6 wherein said body has spring detent means engaging the teeth of the respective jaws to locate the teeth for remeshing with the teeth of the respective actuators upon movement of said spindle and said one actuator in the opposite direction by said spring means.

8. The chuck of claim 6 wherein said spindle abuts said body to provide for limited yielding movement of said one actuator, and of the other actuators, against said spring means during movement of said one actuator in the opposite direction by turning of said spindle while said jaws are engaged with a workpiece.

References Cited

UNITED STATES PATENTS 1,253,224   1/1918   Fisher.
2,602,673   7/1952   Deuring et al. _____ 279—112

ROBERT C. RIORDON, Primary Examiner

D. D. EVENSON, Assistant Examiner

U.S. Cl. X.R.

74—527